United States Patent
Moisio et al.

(10) Patent No.: US 11,277,721 B2
(45) Date of Patent: Mar. 15, 2022

(54) FLEXIBLE SECURITY RATING AND DECISION MECHANISM FOR MACHINE TYPE COMMUNICATIONS

(71) Applicant: Nokia Technologies Oy, Espoo (FI)

(72) Inventors: Martti Moisio, Klaukkala (FI); Silke Holtmanns, Klaukkala (FI); Mikko Uusitalo, Helsinki (FI); Zexian Li, Espoo (FI); Ilkka Keskitalo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 675 days.

(21) Appl. No.: 15/549,583

(22) PCT Filed: Feb. 13, 2015

(86) PCT No.: PCT/US2015/015850
§ 371 (c)(1),
(2) Date: Aug. 8, 2017

(87) PCT Pub. No.: WO2016/130148
PCT Pub. Date: Aug. 18, 2016

(65) Prior Publication Data
US 2018/0240339 A1    Aug. 23, 2018

(51) Int. Cl.
*H04W 4/44*  (2018.01)
*H04W 4/029* (2018.01)
(Continued)

(52) U.S. Cl.
CPC .......... *H04W 4/44* (2018.02); *G08G 1/0112* (2013.01); *G08G 1/0967* (2013.01);
(Continued)

(58) Field of Classification Search
CPC .......... H04W 4/44; H04W 4/46; H04W 4/70; H04W 4/40; H04W 12/06; H04W 12/10;
(Continued)

(56) References Cited

U.S. PATENT DOCUMENTS 7,889,691 B2 *  2/2011  Chen ............ H04H 20/08
                                                    370/315
8,704,679 B2    4/2014  Iyer et al.
(Continued)

FOREIGN PATENT DOCUMENTS

CN    101064870 A   10/2007
CN    101350134 A    1/2009
(Continued)

OTHER PUBLICATIONS

Office Action received for corresponding European Patent Application No. 15712709.3, dated Feb. 26, 2019, 6 pages.
(Continued)

*Primary Examiner* — Isaac G Smith

(57) ABSTRACT

Methods and apparatus, including computer program products, are provided in one aspect there is provided a method. The method may include detecting, at a first node, an event; generating, at the first node, a message in response to the detected event; and sending, at the first node, the message to at least a second node to enable the second node to determine at least one of a reliability or an importance of the message. Related apparatus, systems, methods, and articles are also described.

9 Claims, 5 Drawing Sheets

(51) Int. Cl.
*H04W 4/46* (2018.01)
*H04W 12/06* (2021.01)
*H04W 12/10* (2021.01)
H04L 29/06 (2006.01)
H04W 4/70 (2018.01)
H04W 4/40 (2018.01)
G08G 1/01 (2006.01)
G08G 1/0967 (2006.01)
H04L 9/32 (2006.01)
H04W 4/12 (2009.01)
*H04W 12/72* (2021.01)
*H04W 12/76* (2021.01)

(52) U.S. Cl.
CPC .......... *H04L 9/3247* (2013.01); *H04L 63/126* (2013.01); *H04W 4/029* (2018.02); *H04W 4/12* (2013.01); *H04W 4/40* (2018.02); *H04W 4/46* (2018.02); *H04W 4/70* (2018.02); *H04W 12/06* (2013.01); *H04W 12/10* (2013.01); *H04L 63/0823* (2013.01); *H04W 12/72* (2021.01); *H04W 12/76* (2021.01)

(58) Field of Classification Search
CPC .. G08G 1/0112; G08G 1/0967; H04L 9/3247; H04L 63/126
USPC ......................................................... 701/117
See application file for complete search history.

(56) References Cited

U.S. PATENT DOCUMENTS

| | | | |
|---|---|---|---|
| 9,369,856 B2 | 6/2016 | Dennis et al. | |
| 9,591,024 B2 | 3/2017 | Stählin et al. | |
| 2012/0034876 A1* | 2/2012 | Nakamura | H04L 9/321 |
| | | | 455/66.1 |
| 2013/0279491 A1* | 10/2013 | Rubin | H04W 76/50 |
| | | | 370/347 |
| 2014/0108787 A1 | 4/2014 | Ando | |
| 2014/0143834 A1 | 5/2014 | Stahlin et al. | |
| 2015/0170522 A1* | 6/2015 | Noh | G08G 1/096791 |
| | | | 701/117 |

FOREIGN PATENT DOCUMENTS

| | | |
|---|---|---|
| CN | 101866557 A | 10/2010 |
| CN | 103650464 A | 3/2014 |
| CN | 103731469 A | 4/2014 |
| CN | 104205181 A | 12/2014 |
| WO | 2014/039200 A1 | 3/2014 |
| WO | 2014/039202 A1 | 3/2014 |

OTHER PUBLICATIONS

"Vehicular Communication Systems", Wikipedia, Retrieved on Jul. 25, 2017, Webpage available at: https://en.wikipedia.org/wiki/Vehicular_communication_systems.

"Autonomous Car", Wikipedia, Retrieved on Jul. 25, 2017, Webpage available at: https://en.wikipedia.org/wiki/Autonomous_car.

Ming, "Security, Privacy and Trust in IoT and M2M", Institute for Infocomm Research, Aug. 27, 2014, pp. 1-53.

Stefanov, "Security and Trust in IoT/M2M—Cloud Based Platform", Thesis, Jun. 2013, pp. 1-65.

Ren et al., "Rise: a Reliable and Secure Scheme for Wireless Machine to Machine Communications", Tsinghua Science and Technology, vol. 18, No. Feb. 1, 2013, pp. 100-107.

Can et al., "Sort: a Self-organizing Trust Model for Peer-topeer Systems", IEEE Transactions on Dependable and Secure Computing, vol. 10, No. 1, Jan./Feb. 2013, pp. 14-27.

Petit et al., "Spoofed Data Detection in VANETs Using Dynamic Thresholds", IEEE Vehicular Networking Conference, 2011, pp. 25-32.

International Search Report and Written Opinion received for corresponding Patent Cooperation Treaty Application No. PCT/US2015/015850, dated Oct. 28, 2015, 10 pages.

* cited by examiner

200

Detect, by an M2M node at a vehicle, an event 205

Generate, by the M2M node, a message, wherein the message includes an identity of the M2M node, a location, and/or a time stamp 208

Sending, by the M2M node, to at least one other M2M node the message to enable the other node to determine whether to take an action based on the message, the reliability of the M2M node, and an importance of the event 210

Receiving, at an M2M node at a vehicle, a message including an identity 280

Determine, by the M2M node, a reliability of the message based on the identity 282

Determine, by the M2M node, an importance of the received message 284

Perform, by the M2M node, an action based on the determined identity and determined importance 286

FIG. 2B

FLEXIBLE SECURITY RATING AND DECISION MECHANISM FOR MACHINE TYPE COMMUNICATIONS

RELATED APPLICATION

This application was originally filed as Patent Cooperation Treaty Application No. PCT/US2015/015850 filed Feb. 13, 2015.

FIELD

The subject matter described herein relates to machine-to-machine (M2M) wireless communications including the Internet of Things.

BACKGROUND

Vehicles may include radio systems in order to provide or obtain information, such as traffic information, weather information, and the like. This information may be provided to, or obtained from, other vehicles and/or sensors. For example, a vehicle may automatically obtain traffic information from roadside sensors, and this information may indicate a possible roadside hazard, such as road ice. The use of this information may facilitate autonomous, driverless vehicles as well as enhance the driver-based vehicle experience.

SUMMARY

Methods and apparatus, including computer program products, are provided for message handling.

In some example embodiments, there is provided a method. The method may include detecting, at a first node, an event; generating, at the first node, a message in response to the detected event; and sending, at the first node, the message to at least a second node to enable the second node to determine at least one of a reliability or an importance of the message.

In some variations, one or more of the features disclosed herein including the following features can optionally be included in any feasible combination. The first node may include at least one of a first machine to machine node, a first user equipment, a first base station, or a first wireless access point. The second node may include at least one of a second machine to machine node, a second user equipment, a second base station, or a second wireless access point. The first node may be at a first vehicle to enable at least one of vehicle-to-vehicle communications, vehicle-to-infrastructure communications, infrastructure-to-vehicle communications, person-to-vehicle communications, and/or vehicle-to-person communications. The second node may be at a second vehicle to provide at least one of vehicle-to-vehicle communications, vehicle-to-infrastructure communications, infrastructure-to-vehicle communications, person-to-vehicle communications, and/or vehicle-to-person communications. The generating may include adding to the message an identity of the first node. The message may include at least another identity corresponding to another node handling the message. When the identity comprises a digital signature, the generated message may be signed with the digital signature. The identity may include at least one of a digital certificate, a shared key, an internet protocol address, an international mobile station equipment identity, a mobile station international subscriber directory number, or a group identity. The message may include at least one of an indication of the event, a location associated with the event, or a time stamp associated with the event to enable the determining of the importance. The message may be sent over a local link between the first node and the second node. The local link may include at least one of a Bluetooth link, a Bluetooth Low-Energy link, a near field communications link, a WiFi link, an optical laser link, an infrared link, or a direct link between the first node and the second node. The message may be sent from the first node to the second node over at least an infrastructure communication link comprising at least a cellular link to a base station. The event may include at least one of traffic information, accident information, weather information, or an indication to take an action.

Furthermore, in some example embodiments, there is provided a method. The method may include receiving, at a first node, a message including an identity of at least one node handling the message on a path from a source node for the message to the first node; determining, at the first node, a reliability of the message; determining, at the first node, an importance of the message; and initiating, at the first node based on the determined reliability and the determined importance, performance of an action.

In some variations, one or more of the features disclosed herein including the following features can optionally be included in any feasible combination. The first node may include at least one of a first machine to machine node, a first user equipment, a first base station, or a first wireless access point. The first node may be at a first vehicle to enable at least one of vehicle-to-vehicle communications, vehicle-to-infrastructure communications, infrastructure-to-vehicle communications, person-to-vehicle communications, and/or vehicle-to-person communications. The determining of the reliability may include determining, from the message, at least one identity of the at least one node handling the message, wherein the at least one identity maps to the reliability of the message. The message may include a plurality of identities for a plurality of nodes handling the message on the path to the first node. The reliability may be determined based on the plurality of identities. The reliability may be determined based on a least reliable node handling the message, wherein the least reliable node is determined from the plurality of identities. The reliability may be selected as the reliability of the source node for the message. The importance of the message may be determined based on at least the determined reliability of the message, a type of event indicated by the message, or whether a responsive action is to be initiated at the first node. The at least one node may include the source node.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIGS. 2A-2B depict examples of processes for handling M2M messages among vehicles, in accordance with some example embodiments.

Figure 1A:
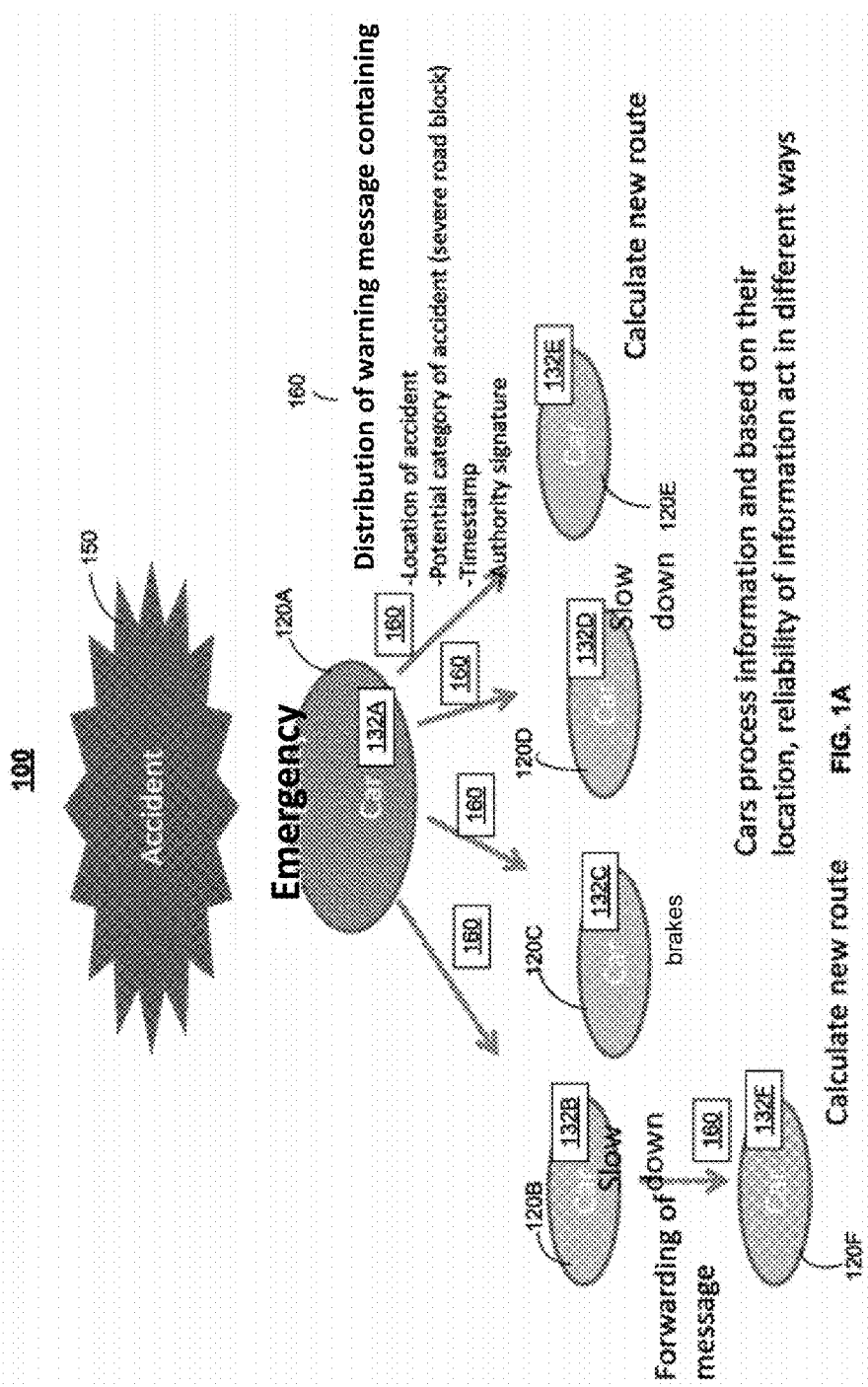
FIGS. 1A-1B depict examples of systems handling M2M messages among vehicles, in accordance with some example embodiments.

Like labels are used to refer to same or similar items in the drawings.

DETAILED DESCRIPTION

Some estimate that at least 50 billion devices may be connected to Internet by 2020. Some of these connected devices may include Machine-to-Machine (M2M) wireless communication nodes (also referred to as the Internet of Things (IOT) nodes or Machine Type Communication devices (MTC devices)). In some IoT applications, issues such as reliability, safety, and/or security may be a concern with respect to deployment of IoT including M2M. One of those applications includes V2V (Vehicle-to-Vehicle) or V2I (Vehicle-to-Infrastructure) communications in which vehicles, such as cars for example, send information related to traffic safety to other vehicles (or users) or to the infrastructure (for example, to the network or other IoT/M2M nodes). The M2M node may receive this information and take an action, and/or forward the information to other nodes either directly or indirectly via other networks (for example, a cloud service such as a server coupled to the internet).

As more and more M2M nodes are connected, M2M node processing of information received from other M2M nodes may be increasingly difficult as the source, reliability, and/or importance of the information may not be known. For example, an M2M node may send information to another M2M node. Without knowing the source, reliability, and/or importance of the information received by the M2M node, the receiver may not know whether or how to process the received information. On the other hand, if the source, reliability, and/or importance of the information is known, a receiving M2M node may be able to better process the received information. For example, if the information regarding an accident is received by an M2M node, the M2M node may decide to brake or reroute the car if the information is reliable and/or from a known source, but if from an unreliable or an unknown source, the receiving M2M may choose to take another action or even no action at all. To further illustrate, a so-called "gossip effect" may occur when a false event triggers an M2M node to send a message to other M2M nodes, and this message may be relayed quickly to nearby M2M nodes, which further relay it to their nearby M2M nodes, causing a massive flooding of unreliable messages including the false information. As such, M2M node processing decisions may be improved when the source, reliability, and/or importance of the received information can be determined.

Although some of the examples described herein refer to vehicle-to-vehicle and, in particular, car-to-car systems, the M2M message handling disclosed herein may be used in other systems including industrial IoT, logistic systems, autonomous or computer aided car driving, health care, and/or any other system.

In some example embodiments, a determination is performed to evaluate the need for a given action based on the evaluated identity (which may connote the reliability) of the sending M2M node(s) and/or the importance level of the information (for example, indicative of an event, such as an accident or any other event or condition) provided by the sending M2M node.

In some example embodiments, the evaluated identity of the sending M2M node(s) reflects the reliability of the information sent by the sending M2M node(s). For example, if the identity is known, it is more likely to be reliable, when compared to an unknown source (or a known source known to be unreliable). Likewise, certain sources, such as emergency vehicles and others, may be more reliable than others.

In some example embodiments, the identity associated with information may include the identity of a plurality of M2M nodes, such as the originating M2M node which generated the initial message including the information as well as other M2M nodes that forwarded/relayed the message to a receiver. The identity of these M2M nodes may be are verified in a variety of ways. For example, an M2M node may access a third party server, such as a certificate authority and/or the like, to verify the identity associated with the message received at the M2M node (although the M2M node may verify the identity in other ways as well). Based on the identity (and thus reliability) check of the identity of the sender(s) of the message including the information, the information received at the M2M node may be classified with a reliability. The reliability may comprise a metric, a level, and/or any other indicator of reliability of the sender(s).

The M2M node may also classify the information received at the M2M node with an importance to the receiving M2M node, in accordance with some example embodiments. The importance may also take into account, among other things, the source identity of the sender(s) (for example, a message from a police officer, emergency vehicle, or other known entity may be more important when compared to another message from an unknown sender). In some example embodiments, the importance may also take into account the type of event, time of event, number of hops the message has traversed, distance to the event, and/or other factors as well.

In some example embodiments, a relative importance of the information received at an M2M node may be determined as noted. The relative importance may be determined based at least one the verification of the identity (or source) of the information (which may be indicative of importance) and/or the level/type/category of importance of the information. The importance of the information may be classified based on whether the information requires an action at the vehicle and the type of action. To illustrate further, a car registered to a certain group (for example, a group associated with a car manufacturer, a group associated with emergency vehicles, such as police, fire, ambulance, and/or the like) may have its identity verified. In this example, the relative importance of the information may take into account the identity (for example, the information from an emergency vehicle may be considered more important relative to an unknown source of the information). Moreover, the information importance classification may be a dynamic classification, in the sense that the importance classification may be determined based what type of an action needs to be taken (or not taken) in response (or reaction) to the information. For example, received information regarding a rain event expected tomorrow may be classified as low importance as no immediate action needs to be taken, while information regarding a road blocked due to an accident requires an immediate direct action (for example, slowing of vehicle speed, rerouting, braking, and the like) and thus has higher importance. Furthermore, an M2M node may take different actions depending on the reliability of the information (based on the certainty on the sender's identify) and based on the information classification with respect to importance.

In some example embodiments, the trustworthiness of received information may also depend, as noted, on the routing path including the identity and reliability of each node handling the information and/or the number of hops the message carrying the information traverses from a source to a destination M2M node.

FIG. 1A depicts an example system 100 including a plurality of vehicles 120A-F, in accordance with some example embodiments. The vehicles 120A-F may comprise any type of vehicle, such as a car, a motorcycle, a bicycle, an aerial drone, and/or the like. Each of the vehicles may include an M2M node 132A-F. An M2M node may include a radio transceiver for M2M communication, at least one processor circuitry, and/or at least one memory.

In the example embodiment of FIG. 1A, an event such as an accident 150 may occur. In response to the accident, vehicle 120A including M2M 132A (which in this example is an emergency vehicle) may generate message 160, such as a warning message including information indicative of the accident. The information may include for example one or more of the following: a location of the accident, a type or category of the event/accident (for example, severe road block), a time stamp, an identity, and/or any other information indicative of the event, such as the accident.

In some example embodiments, each M2M node 132A-F may have, as noted, an identity. Examples of the M2M identity may include a certificate (for example a digital certificate which may be issued by a manufacturer of the vehicle, a regulator, a government agency, or other entity authorized to issue the certificate such as a traffic ministry, department of motor vehicle, and/or the like), a shared key, an internet protocol (IP) address, an international mobile equipment identity) IMEI, a Mobile Station International ISDN Number (MSISDN), and/or any other identifier that can identify an M2M node (or a group of M2M nodes).

In some example embodiments, the M2M node 132A may include the identity in the message 160 indicative of the event, but if a certificate is used, the M2M node may sign the message with the certificate.

In some example embodiments, the signed message 160 may be transmitted wirelessly to one or more other vehicles 120B-F including corresponding M2M nodes 132B-F. In some example embodiments, the vehicle 120A including M2M node 132A may send the signed message via M2M links, such as short-range links (for example, Bluetooth, Bluetooth Low-Energy, near field communications (NFC), WiFi, laser links, infrared links, and/or any other radio technology) to vehicles 120B-E. Although communications among vehicles may be via direct short-range (or local) links, the communications may also include, or be under the control of, another node or network, such as a wireless access point/base station and/or public land mobile network.

In the example of FIG. 1A, vehicle 120B may forward the received warning message 160 to vehicle 120F, in accordance with some example embodiments. Before forwarding the message to vehicle 120F and the like, vehicle 120B may add its identity to the message 160. In some example embodiments, the message sent by vehicle 120B to vehicle 120F may include only the identity of vehicle 120A, while in some embodiments the message 160 may include the identity of some if not all of the nodes handling the message (in which case the message would include the identity of vehicle 120A and 120B (or the M2M nodes therein). An M2M node may be classified as a source, if the M2M node is the original creator of the information, such as warning message 160.

Although FIG. 1A depicts the vehicles including M2M nodes communicating directly with themselves, the vehicle M2M nodes may communicate with other sensors, relays, access points, networks, and/or devices as well, including roadside M2M sensors (for example, traffic lights, signs, and/or the like), roadside relays that extend or repeat the transmissions of other vehicles, and/or the like.

When an M2M node at a given vehicle receives the warning message 160, the M2M node may determine the identity of the nodes handling the message and/or determine the importance of the message. For example, vehicle 120B may determine that the source of the message is an emergency vehicle 120A based on the identity included in the message 160 (which in this example is the digital signature on the message 160). As the message is from an emergency vehicle, vehicle 120B may classify the message as reliable. Moreover, vehicle 120B may further process the message 160 to determine the importance. In this example, the vehicle 120B may determine the reliability of the source as relatively reliable and the importance as relatively high (due in part to the identity of the source as well as the type of event) and thus decide to initiate an action, which in this example is a "slow down" of vehicle 120B.

FIG. 1A also shows that each vehicle may process and assess the reliability and/or importance of messages regarding events and take different corresponding actions as shown by vehicles 120B-120E performing a variety of actions, such as slow down, braking, calculating new route, and the like, based on the same message 160.

In some example embodiments, an M2M node may have a plurality of identities, which may be used for different purposes. An M2M node may, in some example embodiments, be identified by a group identifier. The group identifier may be mapped to (or used by) a group of M2M nodes (or vehicles carrying M2M nodes). For example, a group identifier may identify a car model, type of sensor node (for example, weather sensor, traffic sensor, and/or the like), and/or any other group trait (including, for example, police cars, emergency vehicles, and/or the like). In the case of a group identifier, the vehicle including the M2M node may have a group identity that is not unique to the vehicle/M2M node but rather shared with at least one other M2M node in the group.

There may be, in some example embodiments, a plurality of entities, such as registration authorities, certificate authorities, validation authorities and/or the like, that may provide and/or verify identities (for example, certificates, keys, and/or other identifiers) associated (or included in) the message 160. For example, a receiving M2M node may query an authority node/server to assess the identity or reliability of the sender(s) of message 160, although the M2M node may be able to assess the identity or reliability of the sender(s) without the use of these entities as well.

In some example embodiments, one or more nodes may be designated as validators of signatures or identities associated with a message, such as message 160. These designated nodes may be under the authority or operated by a network operator, regulator, government entity, and/or any other entity charged with validating identities.

Figure 1B:
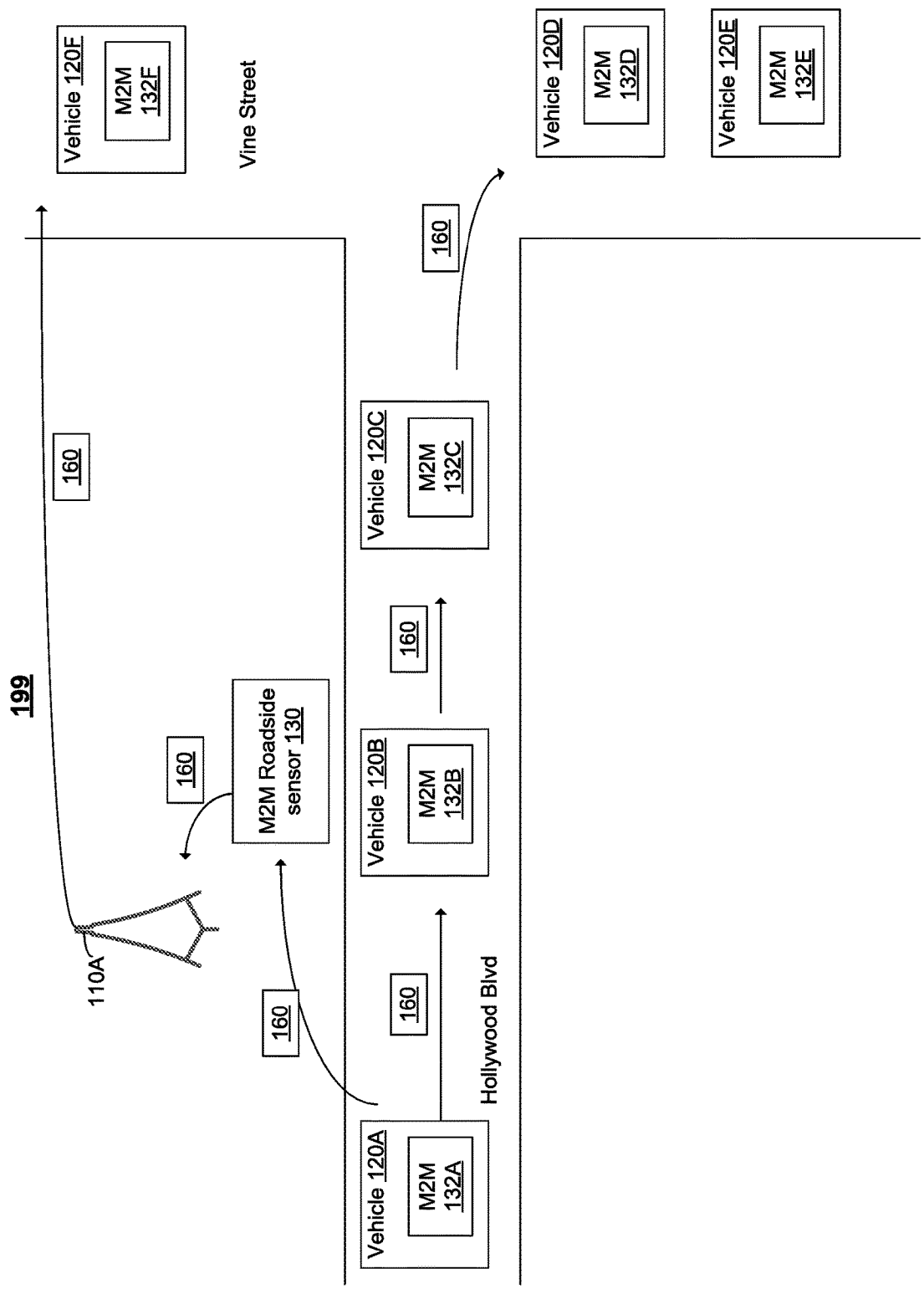

FIG. 1B depicts another example of a system 199 including a plurality of vehicles 120A-F, in accordance with some example embodiments. System 199 may also include an M2M sensor 130, in accordance with some example embodiments. The M2M sensor 130 may be a relay that forwards message 160 to other nodes/networks. Alternatively or additionally, sensor 130 may be any other type of sensor, such as a weather sensor that detects weather (for example, rain, ice, and/or the like), a traffic sensor, a smart sign that can adjust the posted speed limit, and/or the like.

In the example of FIG. 1B, M2M node 132A may transmit the message 160 to other nodes, such as M2M node 132B and sensor 130, via M2M links, as noted above. In this example however, M2M sensor 130 may forward message 160 to a cellular base station 110 for transmission to M2M node 132F, although M2M node 132F may receive message 160 in other ways as well (for example, from M2M node 132C or 132D).

The following provides illustrative use cases which also refer to FIGS. 1A-1B.

As a first example, a vehicle, such as an emergency vehicle 120A, including M2M node 132A may arrive at an accident 150. When this is the case, a message 160 including information about the accident may be generated. The information about the accident may include the location of the accident, time of the accident, type of accident, and/or a suggested action (which in this example would be to avoid accident location). The M2M node 132A may also add to the message its identity by for example signing the message with a key or digital certificate. The emergency vehicle including the M2M node 132A may then broadcast the signed message to other vehicles to enable the other vehicles to take action.

In another example, a vehicle 120A including an M2M node 132A may spot a herd of elk near a road. When this is the case, the M2M node may generate a message including information, such as a warning regarding a heard of elk at a certain location and a certain time. In this example, the M2M may also add to the message an identity by for example signing the message with a key or certificate (which may be the user's personal key or certificate), although the message may not be signed or identified as well. In either case, the vehicle including the M2M node may then broadcast the message to warn other vehicles regarding the herd of elk.

In yet another example, a user may be a designated "traffic spotter" (in which case the user may be registered and obtain a certain or special key for traffic spotters). If the user's vehicle 120A including M2M node 132A encounters a traffic jam, the M2M node may generate a message regarding the traffic jam. In addition to including information about the traffic jam, the message may include an identity which may be implemented by for example signing the message with the user's certain/special key before the broadcast of the message.

In yet another example, an M2M road sensor 130 may monitor traffic, weather, and/or other conditions. In this example, the M2M road sensor may detect freezing road conditions. When this is the case, the M2M node road sensor may generate a message regarding the freezing road condition. The message may be signed using for example a key (for example, a key or certificate issued by the government and/or other entity to roadside M2M sensors). The signed message may then be broadcast to other vehicles including M2M nodes as well as other sensors (for example, a sign including an M2M node which may receive the signed message and display a reduced speed limit due to the freezing road conditions).

If a message including event information (for example, message 160 indicating an accident or other event) is directly communicated between two nodes, the receiving node 120B may only need to verify the identity and thus the reliability of a single node, which in this example is M2M node 132A at vehicle 120A. Given that the vehicle 120A is an emergency vehicle, the receiving M2M node 132B may consider the trust level of the source 120A/132A of the information as relatively high. However, if the message 160 has travelled through many nodes, the trust level may, in accordance with some example embodiments, be adjusted (for example, reduced) based on each hop, although if there is an intermediate reliability check/authentication along the hop path that may not impact (or reduce) the reliability. For example, if a node along the path of message 160 confirms the reliability of message 160 (for example, by signing the message), this may not affect the reliability level. The reliability may also depend on the type of the node through which the message 160 has traversed. For example, if the message 160 goes via a node that does not belonging to a certain or known group, the message may be considered less reliable. In some example embodiments, if the message 160 is handled by a single unknown node, the message 160 may be treated as unreliable. For example, if message 160 traverses M2M nodes 132A-C to reach M2M node 132D and node 132C is not known (or is known to be unreliable), M2M node 132D may treat message 160 as unreliable. In some example embodiments, the reliability of message 160 (which has traversed a plurality of nodes) may be the reliability of the most unreliable node. For example, M2M node may assign to message 160 a reliability in accordance with whichever of M2M nodes 132A-C is least reliable.

In some example embodiments, the reliability level of a message, such a message 160, may be adjusted (for example, decreased) depending on the number of hops between the original source, such as M2M node 150 and the current, most recent sending node, such as node 160. For example, message 160 sent by M2M 132A may indicate a critical accident ahead. When M2M 132D receives message 160, M2M node 132D may decide its subsequent actions based on hop count. For example, if the hop count of message 160 is 1, M2M node 132D may act by initiation of application of a brake to stop the vehicle 120D, but if the hop count is 2, M2M node 132D may react by instead slowing down. And, if the hop count is more than 5 hops for example, M2M node 132D may choose to pick an alternative route; if the hop count is over a given threshold, such as 10 hops for example, M2M node 132D may disregard, discard, and/or not forward message 160.

In some example embodiments, location may be taken into account. For example, message 160 may include a location stamp indicative of the location of the accident 150 and/or vehicle 120A (which in this example is the source node). A receiving node, such as node 132D may calculate the distance from the receiving nodes location to the location stamp. If the location indicates that it is reasonable to have a large quantity of hops, the receiving node 132D may not decrease the reliability of the message 160 as noted above as it is reasonable in this example for a large quantity of nodes to be in the path of the message.

In some example embodiments, an M2M node may calculate an overall reliability level for a received message 160. The overall reliability may be determined based on the originating node's reliability level. Moreover, the source/originating node's reliability may be combined with the reliability of other nodes that handle the message. Further, this may be a weighted combination, so the reliability of the source/originating node is weighed more heavily from other nodes. In addition, the overall reliability may be determined based on the reliability of the least reliable node handling the message. For example, the overall reliability may be set as the reliability level of the least reliable node or a weighted combination of reliability levels that takes into account the least reliable node.

In some example embodiments, the receiving M2M node may include one or more policies defining how to react to different types of messages (or information included in the message 160). For example, an M2M node may take into account the reliability of the source of message/information and the importance of the message/information by processing the message/information in a rule-based system that determines a potential course of action based on the rules (for example, an if then rule-based decision tree).

To illustrate the rule-based decision tree engine, the following example refers to the accident example of FIGS. 1A and 1B. In the case of an accident type of message 160, different actions may be determined by a receiving M2M node, and these actions may include for example preparing to brake, making an alternative route calculation, forwarding message, and/or the like. Given that message 160 (which includes the accident ahead indication) arrives at vehicle 120B/M2M node 132B, M2M node 132B may process the received message 160. The processing may be performed by at least a rules-based engine that may determine location information (if available) from the message 160 (for example, where is the accident) and calculate a distance between the accident and vehicle 120B. M2M node 120B may also determine whether the accident is on the intended route for vehicle 120B (for example, is the accident relevant to vehicle 120B or is it not relevant for vehicle 120B's route). If location is not available or included in message 160, the M2M node 120B may not take location into account. The rules-based processing may also determine if the sender(s) are known. In this example, M2M node 132B may determine that the sender of message 160 is known from its identity (for example, the digital certificate may correspond to an emergency vehicle or group of vehicles). If M2M node 132B can verify the identity of the sender(s), M2M node 132B may classify message 160 as reliable. On the other hand, if M2M node 132B cannot verify the identity of the sender(s), M2M node 132B may classify message 160 as not verified. In this example, M2M node 132B may have a rule that states prepare vehicle 120B for "power brake" as a potential action, if distance is not available and sender is not verifiable. M2M node 132B may have another rule that states if distance is available and sender is not verifiable, an alternative route may be calculated, but if the alternative route is less than 5 minutes, then it is automatically sent to the navigation system at vehicle 120B. But if it is more than 5 minutes, then suggest the alternative route to driver of vehicle 120B. M2M node 132B may have another rule that states if distance is available and the sender is reliable, an immediate action can be taken, such as braking, alternative route, forwarding of message, and/or the like.

Message 160 may, in some example embodiments, trigger a low level actions or indication, such as switching lights on, fog lights on/off, if another car indicates it. For example, in the case in which vehicle 120C sends a message 160 to vehicle 120D, and this message indicates to vehicle 120 to switch its light, vehicle 120D may switch on the fog lights even though message 160 might not be fully verified with respect to reliability (so message 160 may serve as a kind reminder to vehicle 120D).

Although FIGS. 1A-1B depicts specific quantities of devices, other quantities may be used as well.

FIG. 2A depicts an example process for handling M2M messages by a sending M2M node, in accordance with some example embodiments. The description of FIG. 2A also refers to FIGS. 1A and 1B.

At 205, an M2M node may detect an event, in accordance with some example embodiments. For example, M2M node 132A may detect an event, such as accident 150. The event may be detected by a sensor at vehicle 120A, by receipt of an indication (for example, a message, a text, or an alert from another device or a user interface), and/or in detected in other ways as well.

At 208, the M2M node may generate, in response to the event, a message, in accordance with some example embodiments. The message may include the identity of the M2M node, a location (for example, of the vehicle 120 and/or the accident 150), a timestamp of for example when the accident 150 occurred (or was reported), and/or a category for, or description of, the event or accident (for example, severe accident blocking road, accident on side of road, bad weather, frozen road, flooded road, construction, detour, and/or the like). The M2M node's identity may comprise a digital certificate or key, in accordance with some example embodiments, although the identity may take other forms as noted above. In the case of a digital certificate or key, the M2M node may sign the generated message with the M2M's digital certificate or key.

At 210, the M2M node may send the generated message to at least one other M2M node, in accordance with some example embodiments. The message may be sent as a broadcast (for example, via short-range M2M links) to other M2M nodes as noted above, although the message may be sent in other ways as well. The message may be processed at a receiving M2M node, such as M2M node 132B or 132C for example. The identity information associated with the message may enable the receiving node to assess the identity and thus the reliability of the sender. As such, the receiving node can determine what actions to perform next based on the reliability of the sender and the importance of the message (or the event indicated therein). The action may include an instruction to a vehicle as described herein and/or the action may include forwarding the message to another node (in which case the M2M node may add its identity to the message).

FIG. 2B depicts an example process for handling M2M messages by a receiving M2M node, in accordance with some example embodiments. The description of FIG. 2A also refers to FIGS. 1A and 1B.

At 280, an M2M node may receive a message generated by another M2M node, in accordance with some example embodiments. For example, vehicle 120B including M2M node 132B may receive message 160 generated by the source node, M2M node 132A. The message 160 may be received directly via a short-range link, such as WiFi, Bluetooth, and/or the like, although other radio technologies including point-to-point and/or cellular radio technologies may be used as well.

At 282, the M2M node may determine an identity of an M2M node handling the received message, in accordance with some example embodiments. Moreover, the identity may indicate the reliability of the information contained in the message, in accordance with some example embodiments. For example, M2M node 132B may verify the identity of the sender (for example, by accessing a node which verifies identities including certificates, keys, and/or the like, although the node 132B may perform the verification directly without accessing another node). Moreover, the M2M node may determine that the message 160 has traversed a plurality of nodes. For example, M2M node 132D may determine the source M2M node 132A identity as well as the identity of one or more of the nodes 132B-C along the path (for example, the nodes may add their identities to the message 160). If the identity of the sending node(s) can be verified, the identity may be mapped into a reliability, in accordance with some example embodiments. For example, a reliability metric may be calculated in order to assess the reliability of the sender(s) which may also be indicative of the reliability of the message. If the identity cannot be verified, then the message may be considered unreliable (or at least less reliable than a verified message).

At 284, the M2M node may determine an importance of the received message, in accordance with some example embodiments. For example, M2M node 132B may receive message 160 and determine a relative importance of message 160 (for example, the information indicative of the event contained therein). The relative importance may be determined based at least on the identity of the source, the level/type/category of importance of the information, whether the information requires an action at the vehicle, and/or the type of action corresponding to the event indicated by message 160.

At 286, the M2M node may take an action based on the determined identity and the determined importance, in accordance with some example embodiments. Based on the determined identity of the source of the message 160 and the importance of the message 160, the M2M node, such as node 132B may whether or not to initiate an action at the vehicle. In some example embodiments, the processing to determine whether or not to initiate an action may be determined by at least a rule-based engine.

Figure 3:
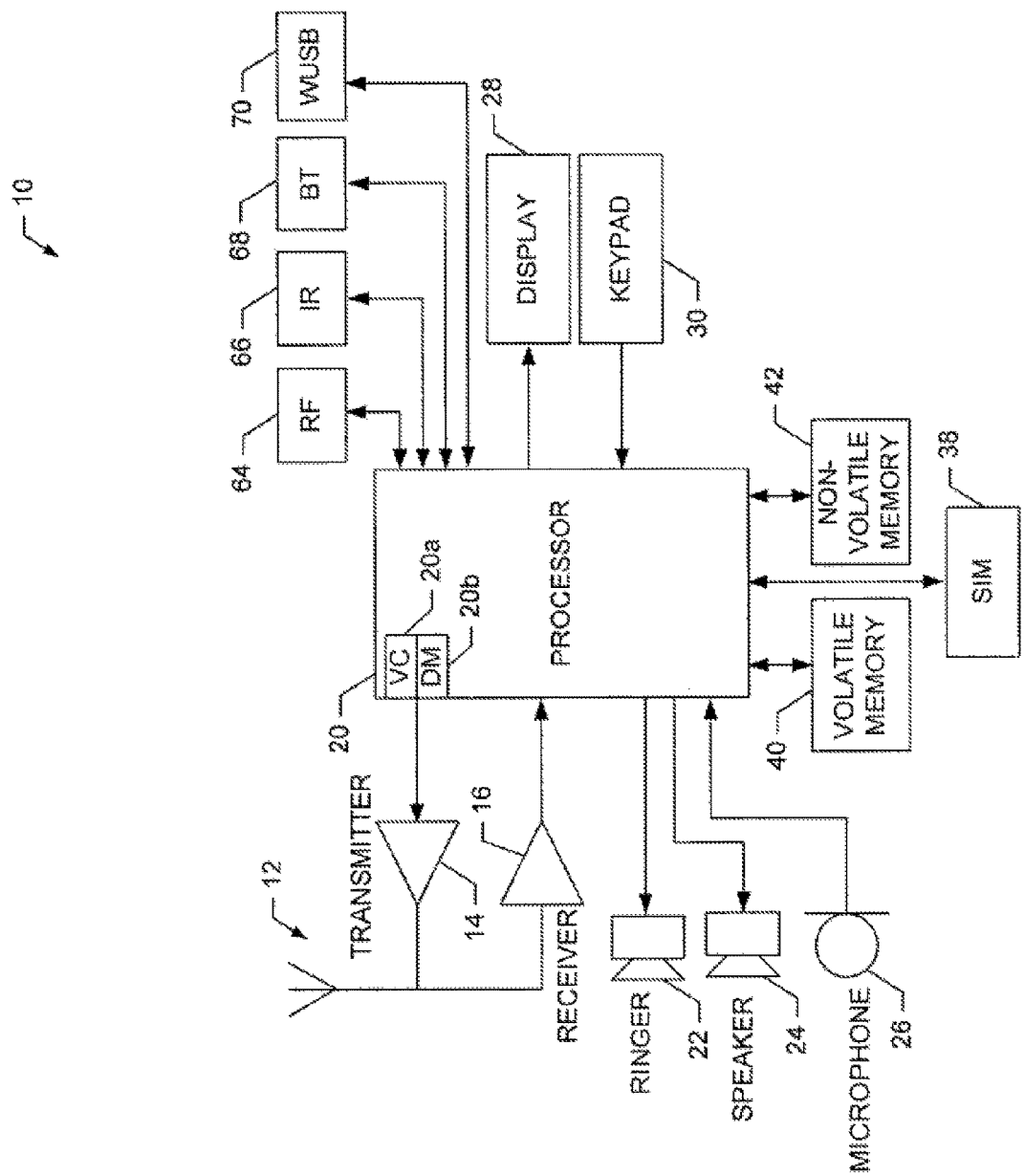
FIG. 3 depicts an example of a radio-based apparatus which may provide aspects of the M2M node, in accordance with some example embodiments.

FIG. 3 illustrates a block diagram of an apparatus 10, which can be configured as a node, in accordance with some example embodiments. For example, the apparatus may be implemented as a M2M node, IoT device, user equipment, and/or any other node configured to send and/or receive messages as disclosed herein. In the case of M2M/IoT, apparatus 10 node may include a radio transceiver, processor circuitry, memory circuitry and/or the like as further described below, to provide machine-to-machine communications (for example, vehicle-to-vehicle communications, vehicle-to-infrastructure communications, infrastructure-to-vehicle communications, person-to-vehicle communications, and/or vehicle-to-person communications). Apparatus 10 may also be used to provide at least a portion of the infrastructure, such as a base station, or wireless access point.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 and/or other input devices.

As shown in FIG. 3, apparatus 10 may also include one or more mechanisms for sharing and/or obtaining data. Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the M2M node. The memories may include the identity disclosed herein. The functions may include one or more of the operations disclosed herein with respect to the M2M node, such as for example the functions disclosed at process 200, 299, and/or any other function disclosed herein. In the example embodiment, the processor 20 may be configured using computer code stored at memory 40 and/or 42 to provide process 200, 299, and/or the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example a computer or data processor circuitry, with examples depicted at FIG. 3. A computer-readable medium may comprise a non-transitory computer-readable storage medium that may be any media that can contain or store the instructions for use by or in connection with an instruction execution system, apparatus, or device, such as for example a computer. Furthermore, some of the embodiments disclosed herein include computer programs configured to cause methods as disclosed herein (see, for example, process 200 and/or the like).

Without in any way limiting the scope, interpretation, or application of the claims appearing below, a technical effect of one or more of the example embodiments disclosed herein is more reliable actions made in response to received M2M messages.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed is:

1. An apparatus, comprising:
   at least one processor; and
   at least one memory including computer program code, the at least one memory and the computer program code configured to, with the at least one processor, cause the apparatus to at least:
   generate a first message in response to a detected first event, the first message comprising first information about the first event;
   add, to the first message, at least a first identity of the apparatus that detected the first event;
   send, to the first node, the first message comprising the first information about the first event and the first identity of the apparatus that detected the first event to enable the first node to take an action based on the first message;
   receive, a second message comprising second information about a second event and a second identity of at least a second node handling the second message on a path toward the apparatus;
   determine, based on a verification of the second identity of at least the second node, a reliability of the second message; and
   initiate, based on the reliability of the second message as determined from the verification of the second identity, performance of an action.

2. The apparatus of claim 1, wherein the first node and the second node each comprise a machine-to-machine node, and wherein the apparatus is further caused to at least:
   verify the second identity of at least the second node based on a key identifying the second node, an internet protocol address identifying the second node, an international mobile station equipment identity identifying the second node, a mobile station international subscriber directory number identifying the second node, and/or a group identity identifying the second node.

3. The apparatus of claim 2, wherein the first node and the second node are each at a vehicle to provide vehicle-to-vehicle communications.

4. The apparatus of claim 1, wherein the apparatus is further caused to at least:
   add, to the message, another identity corresponding to a third node handling the message.

5. The apparatus of claim 1, wherein the first identity of the apparatus comprises a digital signature, and wherein the generated first message is signed with the digital signature.

6. The apparatus of claim 1, wherein the first identity of the apparatus comprises at least one of a digital certificate identifying the apparatus, a key identifying the apparatus, an internet protocol address identifying the apparatus, an international mobile station equipment identity identifying the apparatus, a mobile station international subscriber directory number identifying the apparatus, and a group identity identifying the apparatus.

7. The apparatus of claim 1, wherein the second message includes an indication of the second event, a location associated with the second event, and a time stamp associated with the second event, such that when the verification of the second identity of at least the second node indicates an emergency vehicle, a corresponding reliability of the second message is classified higher when compared to other vehicle types.

8. The apparatus of claim 7, wherein the second event comprises at least one of traffic information, accident information, weather information, or an indication to take an action.

9. The apparatus of claim 7, wherein the action is further initiated based on an importance level of the second message, wherein the importance level is determined higher for the emergency vehicle when compared to the other vehicle types.

* * * * *